United States Patent [19]

Osinski et al.

[11] Patent Number: 5,588,935

[45] Date of Patent: Dec. 31, 1996

[54] THROTTLE CONTROL FOR AUTOMATED MECHANICAL TRANSMISSION

[75] Inventors: Mark A. Osinski, Kalamazoo; Donald D. Teadt, Vicksburg, both of Mich.

[73] Assignee: Eaton Corporation, Cleveland, Ohio

[21] Appl. No.: 537,316

[22] Filed: Sep. 29, 1995

[51] Int. Cl.⁶ .................................................. B60K 41/03
[52] U.S. Cl. ................................................ 477/107; 123/401
[58] Field of Search ...................... 477/107, 111; 123/401

[56] References Cited

U.S. PATENT DOCUMENTS

| | | | |
|---|---|---|---|
| 4,361,060 | 11/1982 | Smyth | 74/866 |
| 4,474,083 | 10/1984 | Braun | 477/107 |
| 4,523,667 | 6/1985 | Smyth | 477/107 |
| 4,531,430 | 7/1985 | Holmes | 74/858 |
| 4,595,986 | 6/1986 | Daubenspeck | 364/424.1 |
| 4,614,126 | 9/1986 | Edelen | 74/333 |
| 4,648,290 | 3/1987 | Dunkley | 74/866 |
| 4,754,665 | 7/1988 | Vandervoort | 74/745 |
| 4,784,019 | 11/1988 | Morscheck | 74/720 |
| 5,063,511 | 11/1991 | Mack | 364/424.1 |
| 5,109,729 | 5/1992 | Boardman | 74/858 |
| 5,117,791 | 6/1992 | Chan | 123/333 |
| 5,335,566 | 8/1994 | Genise | 477/124 |

*Primary Examiner*—Dirk Wright
*Attorney, Agent, or Firm*—Howard D. Gordon

[57] ABSTRACT

An improved throttle control assembly (36) in combination with an electronic controller (48) for controlling shifting in an automated mechanical transmission system (10) having a non-electronically controlled engine (14) is provided. The combination of the throttle control assembly and the control allows the non-electronically controlled engine to be subject to throttle blip as well as throttle dip operations while preventing continuing unsafe conditions as a result of single point failures.

25 Claims, 7 Drawing Sheets

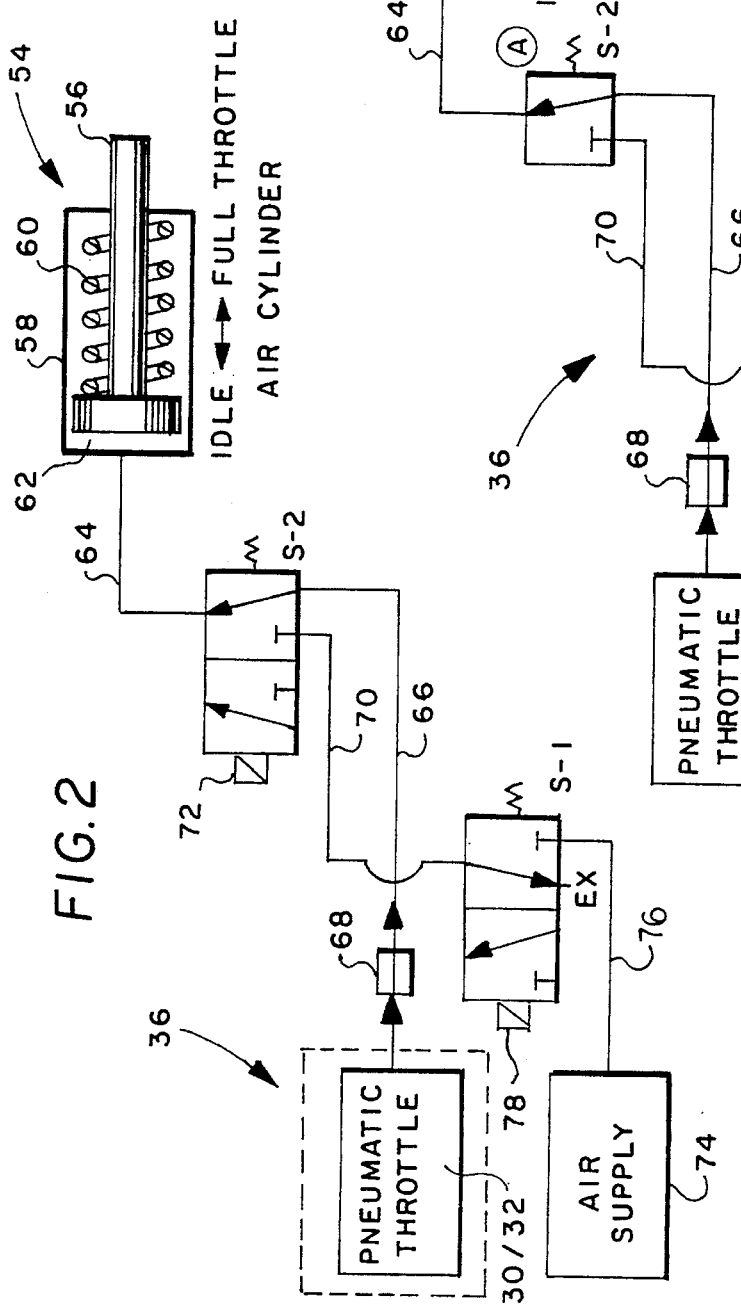

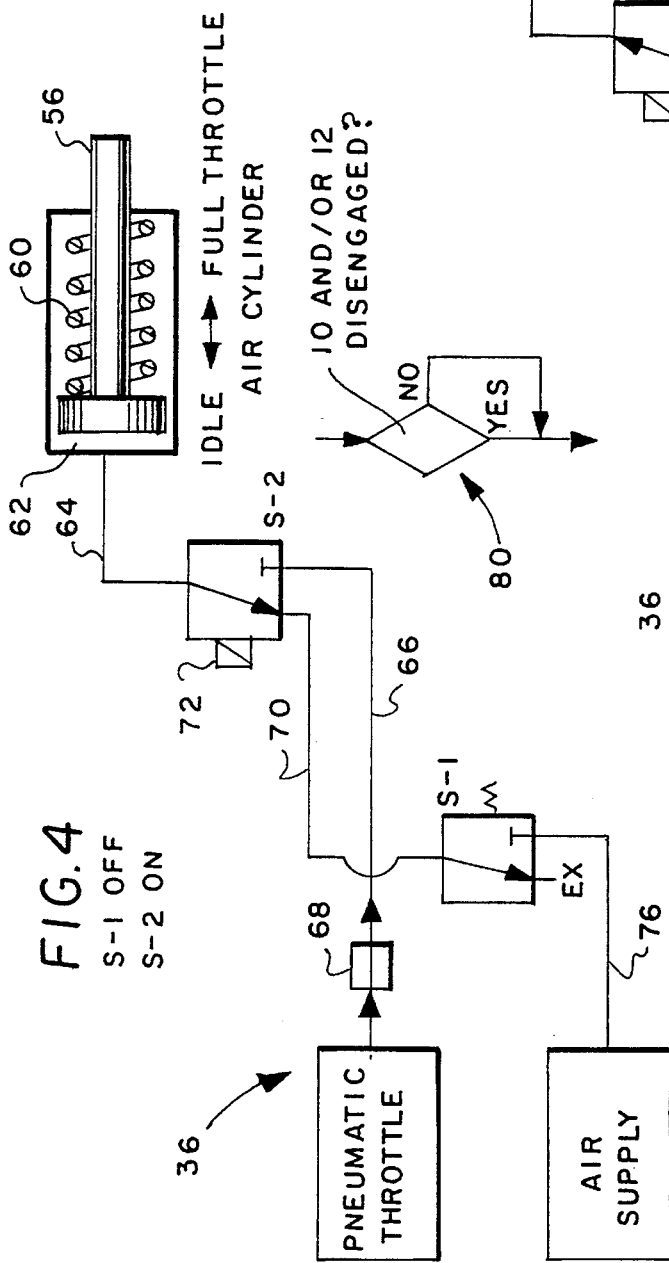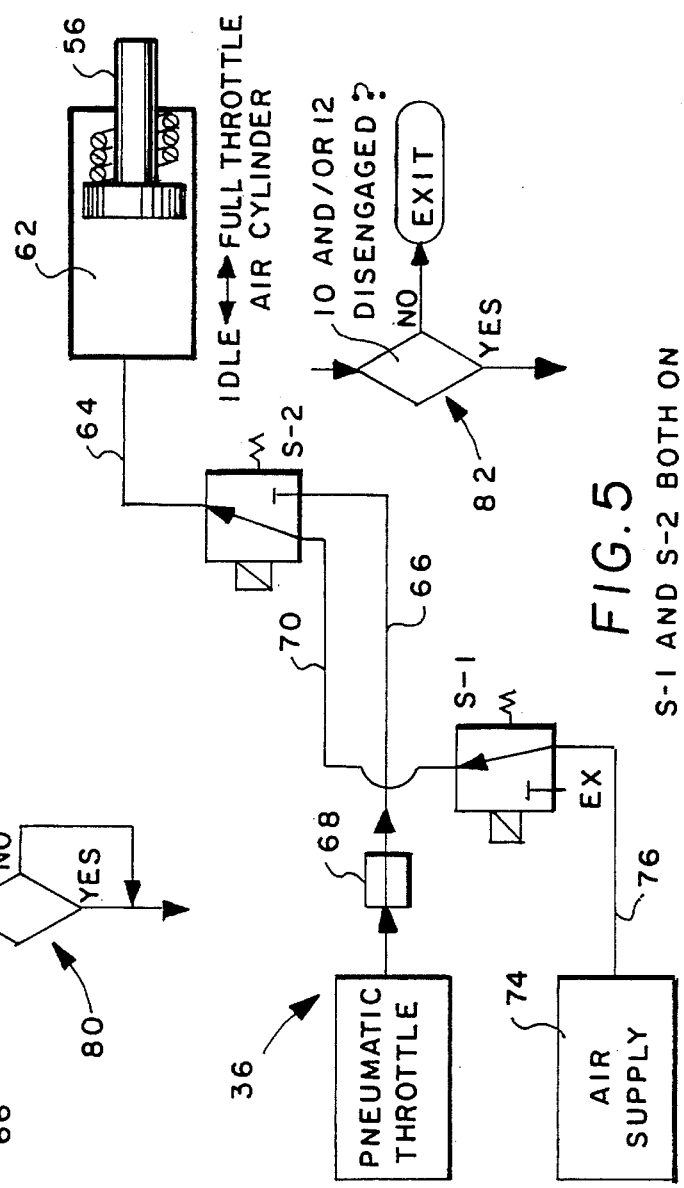

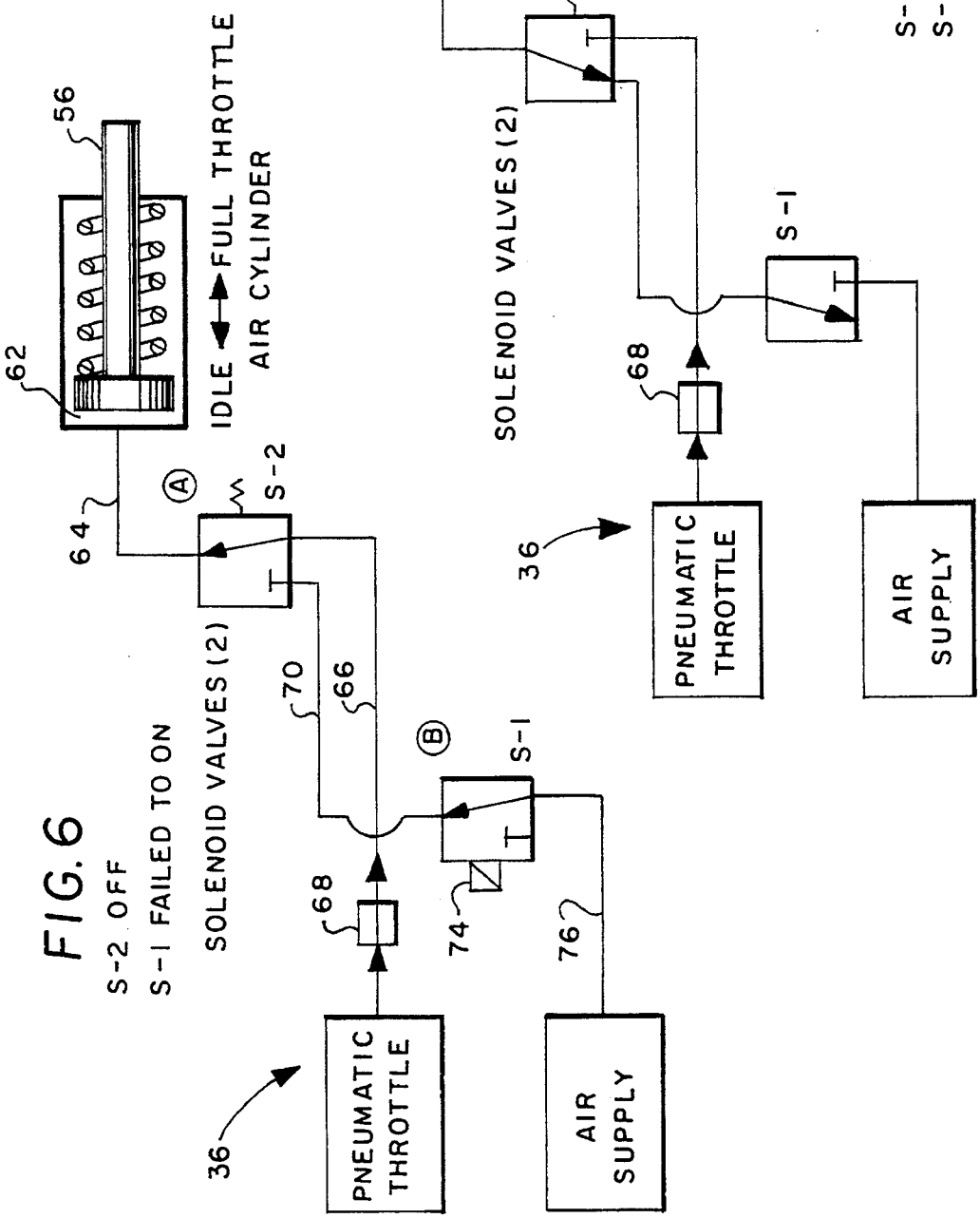

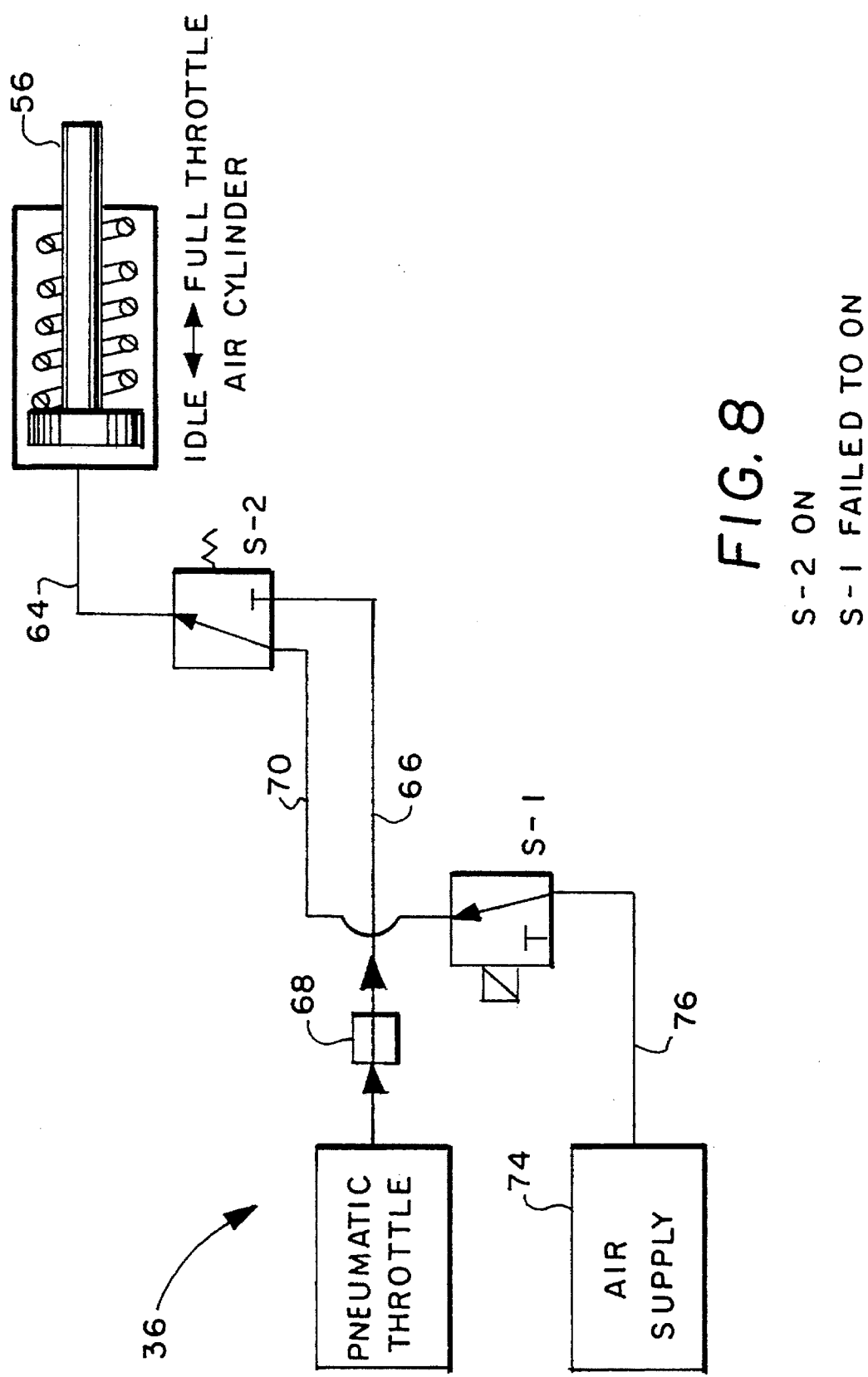

THROTTLE CONTROL FOR AUTOMATED MECHANICAL TRANSMISSION

BACKGROUND OF THE INVENTION

1. Field of the Invention

The present invention relates to controls for controlling engine fueling in a vehicular automated mechanical transmission system. In particular, the present invention relates to controls for automatically controlling the fueling of non-electronically controlled engines in automated mechanical transmission systems during both upshifting and downshifting, which provides improved shift quality, and which will not cause unintended full fueling of the engine with the driveline engaged as the result of a single point failure and will quickly respond to certain multiple point failures leading to undesired increased engine fueling by returning fuel control to the vehicle operator.

2. Description of the Prior Art

Automated mechanical transmission systems and controls therefor are known in the prior art, as may be seen by reference to U.S. Pat. Nos. 4,361,060; 4,595,986; 4,614,126; 4,648,290; 5,063,511; 5,109,729; 5,117,791 and 5,335,566, the disclosures of which are incorporated herein by reference.

In automated mechanical transmission systems equipped with electronically controlled engines (i.e., engines having dedicated microprocessor controllers and communicating with a data bus, such as the data buses conforming to the SAE J-1922 or SAE J-1939 protocols), engine fueling during both upshift and downshift transients typically is controlled by a system controller which causes fuel "dip" (I.e., decreased fueling) or fuel "blip" (I.e., increased fueling), as required, regardless of the operators positioning of the throttle pedal.

In systems with electronically controlled engines, the driver's throttle position is one of multiple inputs to a controller, which issues command output signals to various actuators, including the engine fuel controller (see, for example, U.S. Pat. No. 5,425,284, the disclosure of which is incorporated herein by reference). The controller usually communicates with the engine fuel control over an electronic data link or data bus of the type conforming to a standardized protocol such as SAE J-1922, SAE J-1939 or ISO 11898. In systems with non-electronically controlled engines, the operator's throttle setting is a direct input to the engine fuel controller, which input may be interrupted or modified by various devices.

In vehicles not equipped with electronically controlled engines, automatic throttle dip was used to break torque across engaged jaw clutches for shifting into neutral and to synchronize for upshifts. However, automatic throttle blip was not used during downshift transients to prevent the possible occurrence of a single point failure resulting in the dangerous condition of continuous unintended increased fueling of the engine, especially in conditions of an engaged drivetrain (i.e., master clutch engaged and transmission not in neutral). Such systems typically required manual synchronizing (i.e., increased engine and input shaft speeds) for downshifts and/or used power synchronizer devices (see aforementioned U.S. Pat. Nos. 4,614,126 and 5,063,511) and/or required elaborate redundant safety features.

The prior art automated mechanical transmission systems not utilizing electronically controlled engines were subject to improvement in the areas of control complexity and/or shift rapidity and quality.

SUMMARY OF THE INVENTION

In accordance with the present invention, the drawbacks of the prior art are minimized or overcome by the provision of a relatively simple and inexpensive throttle control mechanism which, in combination with an automated mechanical transmission system control, allows automatic control of engine fueling for both upshifts (throttle dip) and downshifts (throttle blip) in systems not utilizing electronically controlled engines, while maintaining protection against single point failures causing continued, potentially dangerous conditions. Accordingly, it is an object of the present invention to provide a new and improved throttle control mechanism and automated mechanical transmission system control for transmission systems having nonelectronically controlled engines.

This and other objects and advantages of the present invention will become apparent from a reading of the detailed description of the preferred embodiment taken in connection with the drawings.

BRIEF DESCRIPTION OF THE DRAWINGS

FIG. 2 is a schematic illustration of the throttle control system or assembly of the present invention.

FIG. 3 a schematic illustration of the throttle control system of FIG. 2 in its normal (i.e., deenergized) state wherein engine fueling is directly controlled by the vehicle operator.

FIG. 4 a schematic illustration of the throttle control system of FIG. 2 in the throttle dip mode of operation.

FIG. 5 a schematic illustration of the throttle control system of FIG. 2 in the throttle boost or throttle blip mode of operation.

FIGS. 6–8 are schematic illustrations of the throttle control system of FIG. 2 illustrating single point failures therein.

DESCRIPTION OF THE PREFERRED EMBODIMENT

Figure 1:
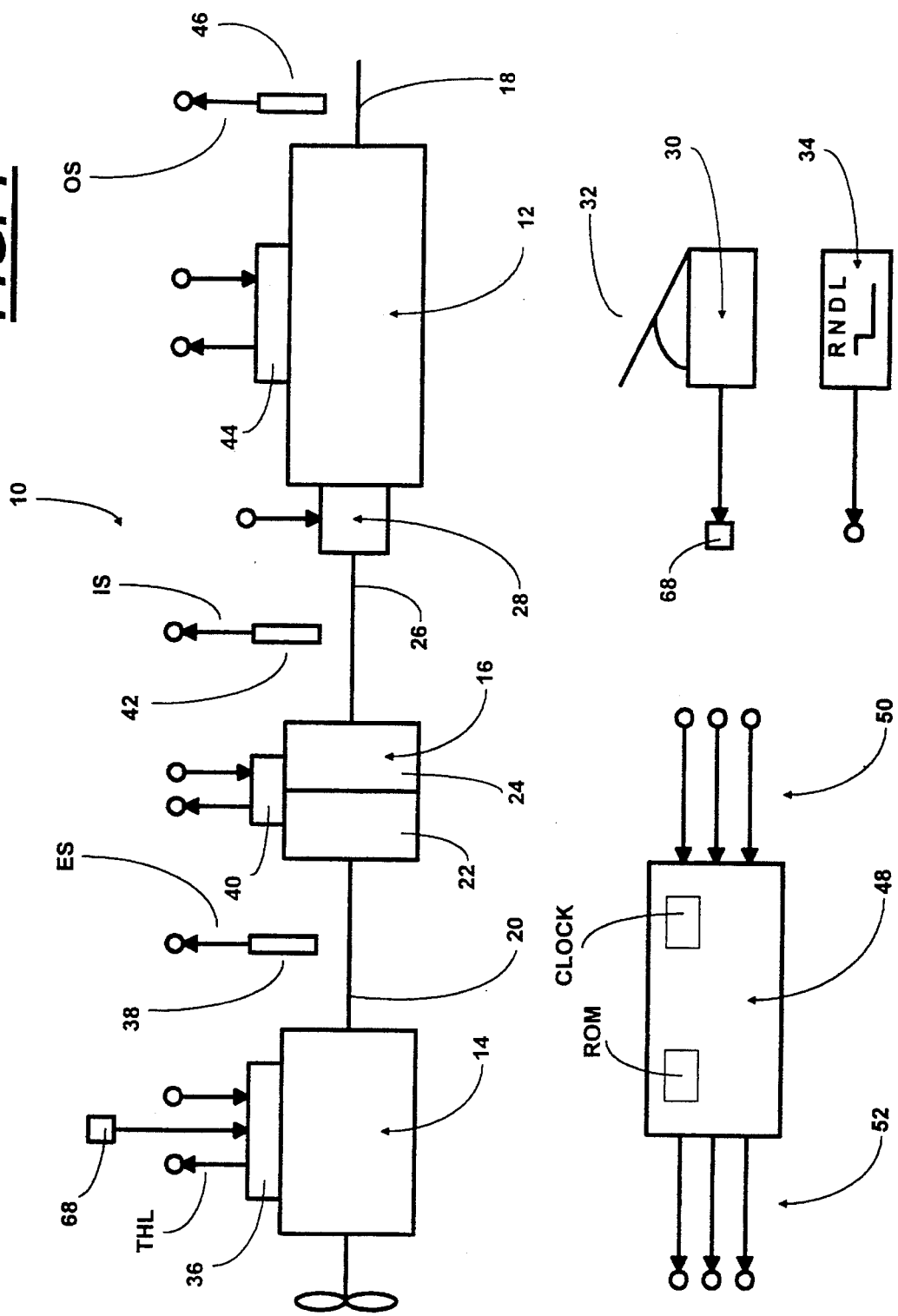
FIG. 1 is a schematic illustration of a vehicular automatic mechanical transmission system utilizing a non-electronically controlled engine.

FIG. 1 schematically illustrates a vehicular automated mechanical transmission system 10 including an automated, multiple-speed, changegear transmission 12 driven by a non-electronically controlled, fuel-controlled engine 14, such as a well-known diesel engine, through a non-positive coupling such as a master friction clutch or torque converter disconnect clutch 16. The output of the automated transmission 12 is output shaft 18, which is adapted for driving connection to an appropriate vehicle component, such as the differential of a drive axle, a transfer case or the like, as is well known in the prior art.

The crank shaft 20 of engine 14 will drive the driving plates 22 of the friction clutch 16, which are frictionally engageable to the driven plates 24 for driving the input shaft 26 of the transmission 12. An upshift or inertia brake 28 may be provided for slowing the rotational speed of the input shaft and the transmission components driven thereby for more rapid upshifting.

While Fig. 1 illustrates the clutch 16 as a master friction clutch, clutch 10 may be a torque converter disconnect or interrupt clutch of the type illustrated in aforementioned U.S. Pat. No. 4,784,019.

The aforementioned power train components are acted upon, monitored by and/or controlled by several devices, each of which will be discussed briefly below. These devices include a throttle pedal position or throttle opening monitor assembly 30, which senses the operator-set position of the operator-controlled throttle pedal 32 and may provide an output signal indicative thereof, and a shift control monitor assembly 34 by which the operator may select a reverse (R), a neutral (N), a forward drive (D) or a low (L) mode of operation of the vehicle. The devices also may include a throttle control assembly 36 for controlling the amount of fuel to be supplied to the engine 14, an engine speed sensor 38 for providing an input signal (ES) indicative of the rotational speed of the engine, a clutch operator 40 which engages and disengages the friction clutch 16 and which also may provide information as to the status of the clutch, an input shaft speed sensor 42 for sensing the rotational speed of the transmission input shaft 26 and for providing an input signal (IS) indicative thereof, a transmission operator 44 effective to shift the transmission 12 into a selected gear ratio and to provide a signal indicative of the gear neutral position and/or the currently engaged gear ratio of the transmission, and an output shaft speed sensor 46 for sensing the rotational speed of the transmission output shaft 18 and for providing a signal (OS) indicative thereof.

Drive components and controls therefor of the type described above are known in the prior art and may be appreciated in greater detail by reference to U.S. Pat. Nos. 4,959,986; 4,576,065 and 4,445,393, the disclosures of which are incorporated herein by reference. The sensors may be of any known type of construction for generating analog and/or digital signals proportional to the parameter monitored thereby. Similarly, the operators may be of any known electric, hydraulic, pneumatic or combination type for executing operations in response to command output signals.

The aforementioned devices supply information to and/or accept command output signals from a central processing unit or controller 48. The central processing unit 48 may include analog and/or digital electronic calculation and logic circuitry, as is well known in the prior art. An electric power source (not shown) and/or a source of pressurized fluid (not shown) provides electrical and/or fluid power to the various sensing and/or operating and/or processing units. As is well known, and as disclosed in aforementioned U.S. Pat. No. 4,595,986, central processing unit 48 is preferably microprocessor-based and is adapted to receive various input signals 50 from the sensors and to process same according to predetermined logic rules to issue command output signals 52 to the appropriate system actuators.

In automated mechanical transmission systems of the type illustrated in FIG. 1, synchronization of the jaw clutch members associated with engagement of a target gear ratio ($GR_T$) is normally accomplished, after a shift into transmission neutral, by increasing or decreasing the input shaft speed to cause the input shaft to rotate at a rotational speed generally equal to the product of the output shaft speed multiplied by the numerical ratio of the target gear ratio ($IS=OS \times GR_T$). For downshifts, where input shaft speed must generally be increased, increased fueling of the engine 14 with the master clutch 16 fully engaged will provide the desired increase in input shaft speed ($ES=IS=OS \times GR_T$). For upshifts, where input shaft speed must generally be decreased, reduced fueling of the engine with the clutch 16 engaged and/or application of the inertia brake 28 with the master clutch 16 disengaged will accomplish the necessary decrease in input shaft speed, as well as providing a torque break. Alternatively, as is known in the prior art, input shaft speed may be decreased for upshifting by maintaining the clutch 16 engaged while applying an engine brake, such as an engine compression brake or an exhaust brake, such as a well-known "Jake brake," as is well known in the heavy truck industry (see aforementioned U.S. Pat. No. 5,409,432). As a further prior art alternative embodiment, increasing and decreasing of the input shaft rotational speed and the rotational speed of the transmission members rotating therewith was accomplished by means of a power synchronizing device of the type illustrated in aforementioned U.S. Pat. No. 4,614,126.

When an initial throttle dip is commanded to allow a shift into neutral, the clutch is also commanded to be disengaged and is expected to disengage in about 0.20 to 0.50 seconds. Upon sensing transmission neutral, for downshifts, the clutch is commanded to reengage.

The throttle control system or assembly 36 of the present invention for controlling the fueling of non-electronically controlled engine 14 may be seen by reference to FIG. 2. The throttle control assembly 36 includes a throttle control piston and cylinder assembly 54 comprising a throttle control piston 56, which is slidably received in a cylinder 58 and is displaceable rightwardly to increase fueling of the engine and leftwardly to decrease fueling of the engine. A spring 60 biases the actuator piston 56 leftwardly toward the idle fueling position thereof. The piston 56 is responsive to pressurization in chamber 62 to move rightwardly against the bias of spring 60 to increase the fueling of the engine.

A three-way, two-position, solenoid-controlled valve S2 is provided to connect conduit 64, which is in fluid communication with piston chamber 62, with either a conduit 66 selectively pressurized in accordance with the output 68 from the throttle control module 30 or with a conduit 70 controlled by a further solenoid-controlled valve S1, to be described in greater detail below. With the solenoid 72 of the solenoid-controlled valve S2 in the non-energized condition, conduit 66 is connected to conduit 64, conduit 70 is blocked, and the fueling of the engine 14 is under the direct control of the operator by means of manipulation of the throttle pedal 32.

A further three-way, two-position, solenoid-controlled valve S1 is operative to connect the conduit 70 to either an exhaust or to a source of pressurized fluid, such as air supply 74 via conduit 76. With solenoid 78 of the solenoid-controlled valve S1 in the non-energized or deenergized position, conduit 70 is connected to exhaust and the pressurized conduit 76 is blocked. When the solenoid 78 of valve S1 is energized, pressurized conduit 76 is fluidly communicated with conduit 70 while the exhaust is blocked.

FIG. 3 illustrates the throttle control system 36 in its normal condition thereof with solenoid-controlled valves S1 and S2 in their deenergized positions wherein the positioning of the throttle-control piston 56 is controlled directly in accordance with output 68 from the throttle pedal 32.

FIG. 4 illustrates the throttle control assembly 36 in the throttle dip mode of operation wherein fueling to engine 14 is decreased, regardless of the magnitude of signal 68, allowing the engine speed to decrease toward the idle speed thereof. In the throttle dip mode of operation, solenoid valve S1 remains deenergized, while solenoid 72 of valve S2 is energized. This causes the solenoid valve S2 to connect conduit 64 and chamber 62 to exhaust through conduit 70 and solenoid-controlled valve S1, while the conduit 66 connected to the operator's pneumatic signal 68 is blocked by the solenoid-controlled valve S2. As may be seen and as may be appreciated in greater detail by reference to logic block 80 and/or to FIGS. 9A and 9B (which illustrate the shift control logic of transmission system 10 in a flow chart format), solenoid-controlled valves S1 and S2 may be commanded to assume the throttle dip positions thereof without requiring that master clutch 16 be disengaged and/or that transmission 12 be in neutral.

FIG. 5 illustates the throttle control assembly 36 of the present invention in the throttle blip or fuel increasing condition thereof. In the throttle blip mode of operation, solenoid valves S1 and S2 both assume the energized positions thereof, causing piston chamber 62 to be connected to the air supply 74 by a conduit 76, solenoid-controlled valve S1, conduit 70, solenoid-controlled valve S2 and conduit 64. In this position, conduit 66 pressurized in accordance with the operator pedal position signal 68 is blocked by solenoid-controlled valve S2 and the throttle-controlled piston 56 is moved rightwardly toward the full throttle position thereof, regardless of the magnitude of signal 68. It is noted that energization of both solenoidcontrolled valves S1 and S2 requires that the driveline be disengaged by means of disengaging either clutch 16 or transmission 12 by causing transmission 12 to assume the neutral condition thereof. The requirement for disengagement of the driveline is symbolically illustrated in logic block 82 in FIG. 5. Preferably, during throttle boost operations, if target engine speed is not achieved within a period of time (such as five seconds, for example), control of fueling is returned to the operator.

Valves S1 and S2 may be pulse-width-modulation-controlled to control the rate of increased and decreased fueling of the engine.

FIGS. 6–8 illustrate the throttle control system of the present invention in various single point failure modes thereof. Not illustrated is a failure mode wherein, during a throttle blip, both solenoid-controlled valves S1 and S2 fail in the off position. In such a situation, the throttle control system will assume the normally non-energized condition illustrated in FIG. 3 and the engine 14 will be fueled in accordance with the operator's setting of the throttle pedal 32. Upon sensing a failure at one or both of the valves S1, S2, the driver or maintenance department will be notified and appropriate fault tolerance and/or failsafe routines implemented.

FIG. 6 illustrates a single point failure wherein solenoid-controlled valve S1 has failed to the on or energized position, which may be the result of an improperly energized solenoid 74 or may be result of the valve's sticking in the illustrated position. Solenoid-controlled valve S2 is properly in the deenergized position. In this situation, piston chamber 62 will continue to be operated in accordance with the output signal 68 from the throttle pedal, while the solenoid-controlled valve S2 will block pressurized air in the conduit 70 from the air supply and conduit 76 through failed valve S1 from reaching the conduit 64. Accordingly, in this position, the single point failure of the solenoid-controlled valve S1 will not affect the fueling of the engine under normal operating conditions.

In Fig. 7, a failure mode is indicated wherein the solenoid-controlled valve S1 is in the off position and the other solenoid-controlled valve, S2, has failed to the on or energized position. In this situation, the throttle control system 36 assumes the "fuel dip" configuration, as illustrated in FIG. 4, and the engine is caused to assume the idle fueled condition. While this is a highly undesirable and inconvenient situation, it is not considered to be a safety problem, as the engine is not caused to be unintentionally fueled in a maximum manner with the drivetrain engaged.

Figure 9A:
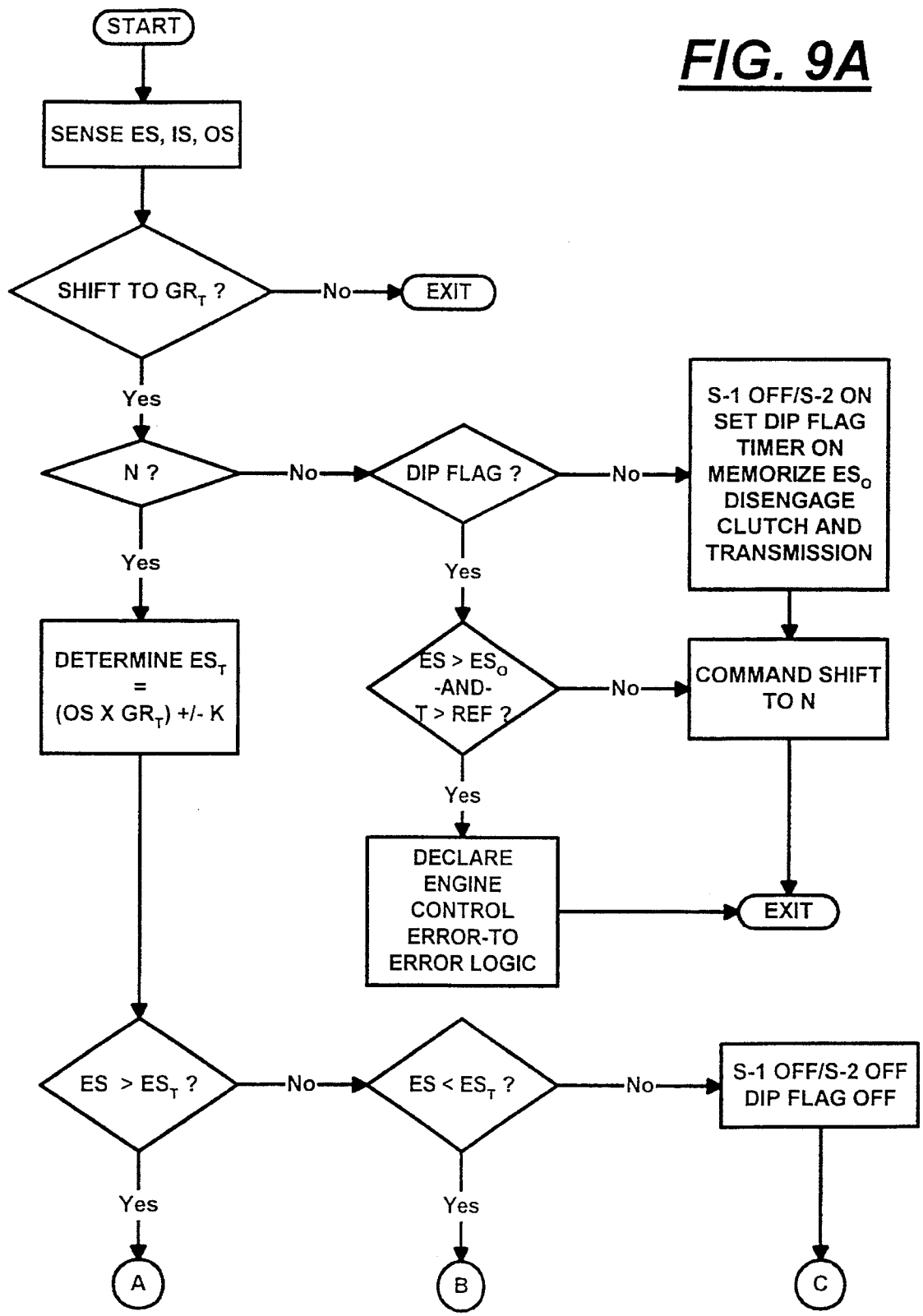
FIGS. 9A and 9B are flow chart representations of the shift control method for controlling upshifting and downshifting of the automated mechanical transmission system of FIG. 1.
Figure 9B:
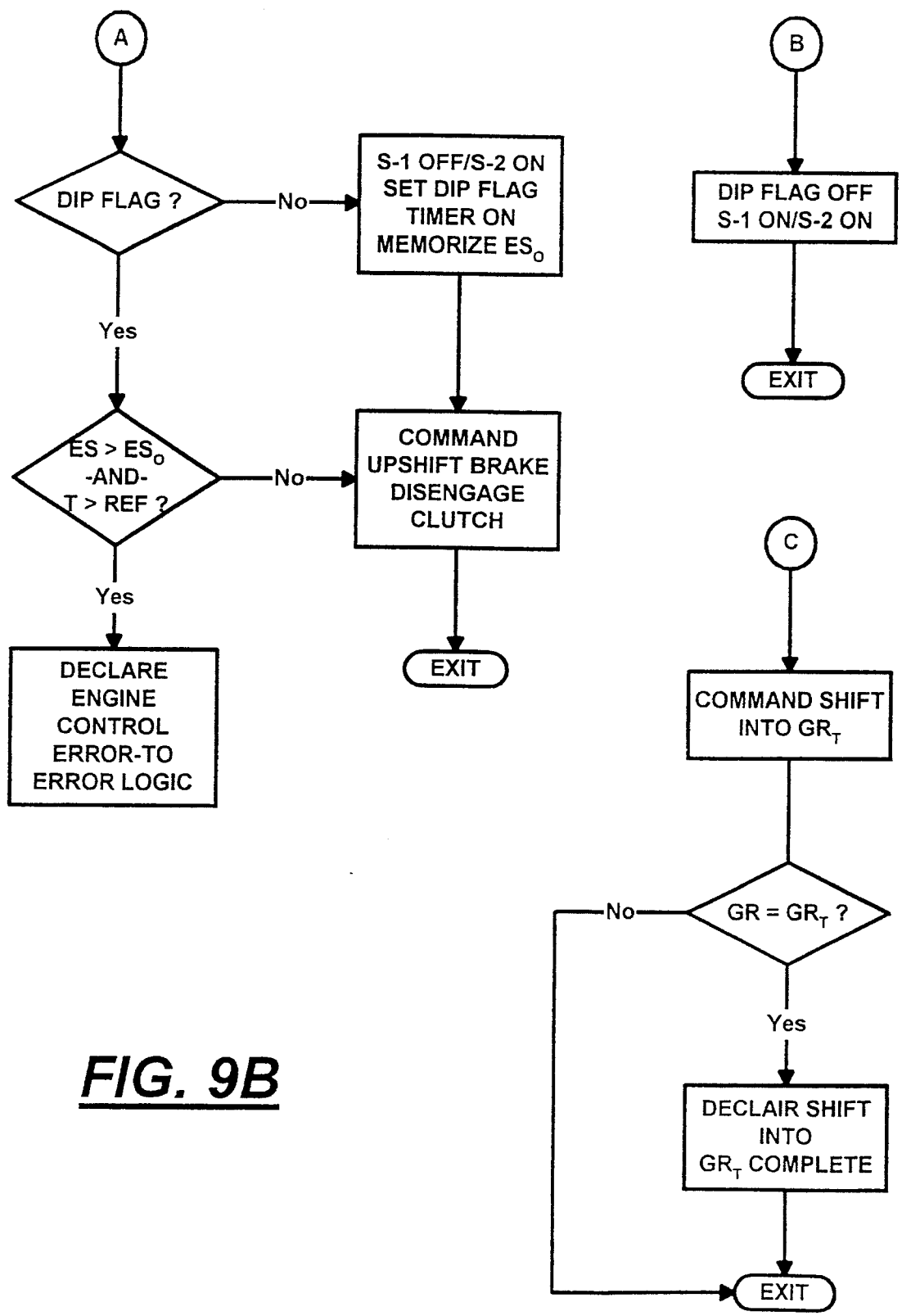

As a safety feature, see FIGS. 9A and 9B, which are flow chart representations of the shift control logic rules for controlling automated mechanical transmission system 10, when a throttle dip has been commanded (i.e., when solenoid-controlled valve S1 is caused to assume the off or deenergized position and solenoid-controlled valve S2 is caused to assume the on or energized position), a throttle dip flag is set, a timer is started, and an initial engine speed, $ES_o$, is memorized. At the expiration of a referenced period of time (such as, for example, one second) and during continued throttle dip conditions, if the engine speed equals or exceeds the initial engine speed or a decremental value thereof (T>REF and $ES>ES_o$?), an engine control error is declared and the solenoid-controlled valve S2 is commanded to assume the off or deenergized position thereof. Alternatively and/or additionally, upon sensing an engine control error, the master clutch 16 may be commanded to the disengaged position thereof. Further energization of valves S1 and S2 is prevented and/or further shifting prohibited.

FIG. 8 illustrates a single point failure of throttle control assembly 36 wherein, during a throttle dip operation in which the solenoid-controlled valve S2 is in the on or energized position, the other solenoid-controlled valve, S1, fails to the on or energized position. In this situation, as a result of the single point failure at solenoid S1, the throttle control system 36 will assume the undesirable configuration wherein, during a desired throttle dip operation, engine fueling is increased rather than decreased, while the drivetrain may be momentarily in an engaged condition. While this is highly undesirable, the single point failure at solenoid-controlled valve S1 will cause this condition to exist only until such time as is required to cause the transmission to shift to neutral or the master clutch 16 to disengage or to declare an engine control error, which will result in the solenoid-controlled valve S2's being returned to the off or deenergized condition (see FIG. 6) wherein the fueling of the engine will again be controlled by the operator's setting of the throttle pedal.

Of course, when one or more throttle control system faults are sensed, the driver will be notified of a potentially unsafe condition and should pull off the road in a safe manner and/or seek maintenance at the earliest opportunity. Alternatively, upon sensing a single point failure, the driver may be notified that the vehicle will remain operational only for a limited period of time (such as five or ten minutes) to allow him to bring the vehicle safely to a more desirable location.

The control logic for controlling automated mechanical transmission 10 during up- and downshifts into a target gear ratio are schematically illustrated in flow chart format in FIGS. 9A and 9B.

While the fuel control assembly 36 is illustrated as pneumatically controlled, it could be hydraulically and/or electrically actuated. In an electrically actuated embodiment, the valves S1 and S2 may be replaced by switches or the like, and the piston/cylinder assembly may be replaced by a stepper motor or the like.

Although the present invention has been described with a certain degree of particularity, it is understood that various modifications are possible without departing from the spirit and the scope of the invention as hereinafter claimed.

We claim:

1. In combination, a throttle control assembly (36) and system controller (48) for controlling shifting in an automated mechanical transmission system (10) having a non-electronically controlled engine (14):

said throttle control assembly comprising a fuel controller (54) responsive to a control signal at an inlet (64/62) thereto to provide fueling of the engine in a minimum (idle) to a maximum amount, a first signal device (30) for providing a first signal (68) proportional to an operator setting of a manually controlled throttle device (32), a second signal device (74) for providing a second signal (76) effective when connected to said inlet to cause said fuel controller to fuel said engine to said maximum amount, said fuel controller biased to the position for fueling said engine in said minimum amount and effective to cause said engine to be fueled in said minimum amount in the absence of a signal at said inlet, a first control device (S1) having a first and second position and a second control device (S2) having a first and second position, said control devices cooperatively effective (i) when said first and second devices are both in the first positions thereof to connect said first signal to said inlet, (ii) when said first control device is in the first position thereof and said second control device is in the second position thereof, to cause an absence of a signal at said inlet, (iii) when said first control device is in the second position thereof and said second control device is in the first position thereof, to cause said first signal to be connected to said inlet, and (iv) when both said first and second control devices are in the second positions thereof, to cause said second signal to be connected to said inlet; and said control having a memory for storing logic rules for (i) causing said first and second control devices to assume said first positions thereof when fueling of the engine is to be controlled by the operator, (ii) causing said first control device to assume said first position thereof and said second control device to assume said second position thereof when decreased fueling of said engine is required, and (iii) causing said first and second control devices to assume said second positions thereof when increased fueling of said engine is required.

2. The combination of claim 1 wherein said control additionally includes means for sensing the engaged and not-engaged conditions of said transmission and said first and second control devices are caused to both assume said second positions thereof only upon sensing said transmission in the not-engaged condition thereof.

3. The combination of claim 1 wherein said control additionally includes means for sensing the rotational speed of said engine and timer means and said logic rules include rules effective upon initiation of causing said first control device to assume said first position thereof and said second control device to assume said second position thereof to initiate said timer and to memorize the initial engine speed ($ES_o$) and, thereafter, during continually causing said first control device to be in the first position thereof and said second control device to be in the second position thereof and after a period of time greater than a reference time, comparing current engine speed to an engine error value equal to or less than said initial engine speed and, if current engine speed is equal to or greater than engine error value ($ES \geq ES_o$?), causing said second control device to assume the first position thereof.

4. The combination of claim 3 wherein, if current engine speed is equal to or greater than said engine error value, said logic rules include rules for causing said first and second control devices to remain in the first positions thereof.

5. The combination of claim 3 wherein, if current engine speed is equal to or greater than said engine error value, said logic rules include rules for prohibiting further transmission shifting.

6. The combination of claim 3 wherein said logic rules will additionally cause a master clutch to be disengaged or said transmission to assume a non-engaged condition thereof in response to determining that engine speed equals or exceeds engine error value.

7. The combination of claim 2 wherein said control additionally includes means for sensing the rotational speed of said engine and timer means and said logic rules include rules effective upon initiation of causing said first control device to assume said first position thereof and said second control device to assume said second position thereof to initiate said timer and to memorize the initial engine speed ($ES_o$) and, thereafter, during continually causing said first control device to be in the first position thereof and said control device to be in the second position thereof and after a period of time greater than a reference time, comparing current engine speed to an engine error value equal to or less than said initial engine speed and, if current engine speed is equal to or greater than engine error value ($ES \geq ES_o$?), causing said second control device to assume the first position thereof.

8. The combination of claim 7 wherein, if current engine speed is equal to or greater than said engine error value, said logic rules include rules for causing said first and second control devices to remain in the first positions thereof.

9. The combination of claim 7 wherein, if current engine speed is equal to or greater than said engine error value, said logic rules include rules for prohibiting further transmission shifting.

10. The combination of claim 1 wherein said automated mechanical transmission system includes a controlled friction clutch (16) drivingly interposed said engine and a transmission input shaft, said logic rules further comprising rules for causing said clutch to disengage upon initially causing said first control device to assume the first position thereof and the second control device to assume the second position thereof.

11. The combination of claim 2 wherein said automated mechanical transmission system includes a controlled friction clutch (16) drivingly interposed said engine and a transmission input shaft, said logic rules further comprising rules for causing said clutch to disengage upon initially causing said first control device to assume the first position thereof and the second control device to assume the second position thereof.

12. The combination of claim 3 wherein said automated mechanical transmission system includes a controlled friction clutch (16) drivingly interposed said engine and a transmission input shaft, said logic rules further comprising rules for causing said clutch to disengage upon initially causing said first control device to assume the first position thereof and the second control device to assume the second position thereof.

13. The combination of claim 4 wherein said automated mechanical transmission system includes a controlled friction clutch (16) drivingly interposed said engine and a transmission input shaft, said logic rules further comprising rules for causing said clutch to disengage upon initially causing said first control device to assume the first position thereof and the second control device to assume the second position thereof.

14. A pressurized, fluid-actuated throttle control assembly (36) for controlling fueling of a non-electronically controlled engine (14) in an automated mechanical transmission system (10), said throttle control assembly comprising a fuel control actuator (54) comprising a piston member (56) slidably and sealingly received in a cylinder (58), said piston member movable from a first axial position wherein said engine is fueled at a minimum level (idle) to a second axial position wherein said engine is fueled at a maximum level, said piston biased to said first axial position thereof, said piston and cylinder defining a chamber (62) fluidly connected to a control conduit (64), pressurization of said chamber effective to cause said piston to move against said bias from said first axial position toward said second axial position thereof, a first source of constantly pressurized fluid (74) providing fluid of a pressure when applied to said chamber sufficient to cause said piston to move from said first axial position to said second axial position thereof, a second throttle pedal position-controlled source of pressurized fluid independent from said first source of pressurized fluid, said second source of pressurized fluid providing fluid at a pressure proportional to operator setting of a manually controlled throttling device (32), a first supply conduit (76) extending from said first source and a second supply conduit (66) extending from said second source, a connecting conduit (70), a first solenoid-controlled valve having a deenergized position for blocking said first supply conduit and connecting said connecting conduit to an exhaust and an energized position for connecting said first supply conduit to said connecting conduit and blocking said exhaust, a second solenoid-controlled valve having a deenergized position for connecting said second supply conduit to said control conduit and blocking said connecting conduit and an energized position for connecting said connecting conduit to said control conduit and blocking said second supply conduit.

15. The throttle control assembly of claim 6 wherein said pressurized fluid is a pressurized gas.

16. In combination, a pneumatically controlled throttle control assembly (36) and microprocessor-based system controller (48) for controlling shifting in an automated mechanical transmission system (10) having a non-electronically controlled engine (14);

a pneumatically actuated throttle control assembly (36) for controlling fueling of a non-electronically controlled engine (14) in an automated mechanical transmission system (10), said throttle control assembly comprising a fuel control actuator (54) comprising a piston member (56) slidably and sealingly received in a cylinder (58), said piston member movable from a first axial position wherein said engine is fueled at a minimum level (idle) to a second axial position wherein said engine is fueled at a maximum level, said piston biased to said first axial position thereof, said piston and cylinder defining a chamber (62) fluidly connected to a control conduit (64), pressurization of said chamber effective to cause said piston to move against said bias to move from said first axial position toward said second axial position thereof, a first source of constantly pressurized fluid (74) providing fluid of a pressure when applied to said chamber sufficient to cause said piston to move from said first axial position to said second axial position thereof, a second throttle pedal position-controlled source of pressurized fluid independent from said first source of pressurized fluid, said second source providing fluid at a pressure proportional to the operator setting of a manually controlled throttling device (32), a first supply conduit (76) extending from said first source and a second supply conduit (66) extending from said second source, a connecting conduit (70), a first solenoid-controlled valve having a deenergized position for blocking said first supply conduit and connecting said connecting conduit to an exhaust and an energized position for connecting said first supply conduit to said connecting conduit and blocking said exhaust, a second solenoid-controlled valve having a deenergized position for connecting said second supply conduit to said control conduit and blocking said connecting conduit and an energized position for connecting said connecting conduit to said control conduit and blocking said second supply conduit; and said control having a memory for storing logic rules for (i) causing said first and second solenoid-controlled valves to be deenergized when fueling of the engine is to be controlled by the operator, (ii) causing said first solenoid-controlled valve to be deenergized and said second solenoid-controlled valve to be energized when decreased fueling of the engine is required, and (iii) causing both said first and second solenoid-controlled valves to be energized when increased fueling of the engine is required.

17. The combination of claim 16 wherein said control additionally includes means for sensing the engaged and not-engaged conditions of said transmission and said first and second solenoid-controlled valves are caused to assume said energized positions thereof only upon sensing said transmission in the not-engaged condition thereof.

18. The combination of claim 16 wherein said control additionally includes means for sensing the rotational speed of said engine and timer means and said logic rules include rules effective upon initiation of causing said first solenoid-controlled valve to assume said deenergized position thereof and said second solenoid-controlled valve to assume said energized position thereof to initiate said timer and to memorize the initial engine speed ($ES_o$) and, thereafter, during continually causing said first solenoid-controlled valve to be in the deenergized position thereof and said second solenoid-controlled valve to be in the energized position thereof and after a period of time greater than a reference time, comparing current engine speed to an engine error value equal to or less than said initial engine speed and, if current engine speed is equal to or greater than engine error value ($ES \geq ES_o$?), causing said second solenoid-controlled valve to assume the deenergized position thereof.

19. The combination of claim 18 wherein, if current engine speed is equal to or greater than said engine error value, said logic rules include rules for causing said first and second control devices to remain in the deenergized positions thereof.

20. The combination of claim 18 wherein, if current engine speed is equal to or greater than said engine error value, said logic rules include rules for prohibiting further transmission shifting.

21. The combination of claim 18 wherein said logic rules will additionally cause a master clutch to be disengaged or said transmission to assume a non-engaged condition thereof in response to determining that engine speed equals or exceeds initial engine speed.

22. The combination of claim 17 wherein said control additionally includes means for sensing the rotational speed of said engine and timer means and said logic rules include rules effective upon initiation of causing said first solenoid-controlled valve to assume said deenergized position thereof and said second solenoid-controlled valve to assume said energized position thereof to initiate said timer and to memorize the initial engine speed ($ES_o$) and, thereafter, during continually causing said first solenoid-controlled valve to be in the deenergized position thereof and said second solenoid-controlled valve to be in the energized position thereof and after a period of time greater than a reference time, comparing current engine speed to an engine error value no greater than said initial engine speed and, if current engine speed is equal to or greater than initial engine speed ($ES \geq ES_o$?), causing said second solenoid-controlled valve to assume the deenergized position thereof.

23. The combination of claim 16 wherein said logic rules further comprise rules for causing a friction clutch to be disengaged upon initially causing said first solenoid-controlled valve to be in the deenergized position thereof and said second solenoid-controlled valve to be in the energized position thereof.

24. The combination of claim 17 wherein said logic rules further comprise rules for causing a friction clutch to be disengaged upon initially causing said first solenoid-controlled valve to be in the deenergized position thereof and said second solenoid-controlled valve to be in the energized position thereof.

25. The combination of claim 18 wherein said logic rules further comprise rules for causing a friction clutch to be disengaged upon initially causing said first solenoid-controlled valve to be in the deenergized position thereof and said second solenoid-controlled valve to be in the energized position thereof.

* * * * *